(12) United States Patent
Kawaoka et al.

(10) Patent No.: US 7,274,481 B2
(45) Date of Patent: Sep. 25, 2007

(54) PRINT ORDER SYSTEM AND METHOD

(75) Inventors: Yoshiki Kawaoka, Asaka (JP); Hiroshi Tanaka, Asaka (JP); Yasuhiro Shinkai, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 238 days.

(21) Appl. No.: 10/896,933

(22) Filed: Jul. 23, 2004

(65) Prior Publication Data

US 2004/0257616 A1 Dec. 23, 2004

Related U.S. Application Data

(62) Division of application No. 09/612,093, filed on Jul. 7, 2000.

(30) Foreign Application Priority Data

Jul. 9, 1999 (JP) ................................ 11-195434

(51) Int. Cl.
G06F 15/00 (2006.01)
G06Q 30/00 (2006.01)
(52) U.S. Cl. .......................... 358/1.15; 705/15; 705/26
(58) Field of Classification Search ................ 358/1.1, 358/1.5, 1.15, 407; 379/67.1; 705/15, 26
See application file for complete search history.

(56) References Cited

U.S. PATENT DOCUMENTS

| | | | | |
|---|---|---|---|---|
| 5,465,291 A | * | 11/1995 | Barrus et al. ............... | 379/67.1 |
| 5,845,263 A | * | 12/1998 | Camaisa et al. ............... | 705/27 |
| 5,979,604 A | * | 11/1999 | Pinna et al. ................... | 186/39 |
| 6,064,427 A | | 5/2000 | Shiota et al. | |
| 6,177,887 B1 | * | 1/2001 | Jerome ......................... | 725/76 |
| 2005/0276418 A1 | * | 12/2005 | Hagiwara ................... | 380/270 |
| 2006/0122896 A1 | * | 6/2006 | Parsley ........................ | 705/26 |
| 2006/0148402 A1 | * | 7/2006 | Hagiwara ................... | 455/41.1 |

FOREIGN PATENT DOCUMENTS

| | | |
|---|---|---|
| JP | 05-120570 | 5/1993 |
| JP | 06-148850 | 5/1994 |
| JP | 08-147567 | 6/1996 |
| JP | 08-249544 | 9/1996 |
| JP | 08-263179 | 10/1996 |
| JP | 10-078620 | 3/1998 |
| JP | 10-134251 | 5/1998 |
| JP | 11-125867 | 5/1999 |
| JP | 11-168684 | 6/1999 |
| JP | 2005084886 A2 * | 3/2005 |
| JP | 2005084897 A2 * | 3/2005 |

* cited by examiner

*Primary Examiner*—Kimberly A. Williams
(74) *Attorney, Agent, or Firm*—Birch, Stewart, Kolasch & Birch, LLP

(57) ABSTRACT

A user orders prints of pictures in a relatively easy manner. In a place such as a convenience store, a print order device and a print order receiver are installed with a one-to-one correspondence therebetween. The user orders prints of images from the print order device. The contents of order are sent to the print order receiver. The receiver produces prints of pictures according to the order. A store clerk passes the prints to the user.

22 Claims, 17 Drawing Sheets

Fig. 5

AUTOMATIC PRINT FILE

PRT INFO.TXT

{
JOB_ID = 01
TYPE = STANDARD
QUANTITY = 1
FILE = ¥IMAGES¥IMG00001.JPG
}

{
JOB_ID = 02
TYPE = STANDARD
QUANTITY = 8
FILE = ¥IMAGES¥IMG00003.JPG
}

{
JOB_ID = 03
TYPE = STANDARD
QUANTITY = 4
FILE = ¥IMAGES¥IMG00004.JPG
}

⋮

{
JOB_ID = *NN*
TYPE = STANDARD
QUANTITY = 2
FILE = ¥IMAGES¥IMGnnnnn.JPG
}

*Fig. 6*

HISTORY FILE

PRT HIST.TXT

AUTOFILE_DATETIME = 1998:01:01:12:30:00
AUTOFILE_STATUS = COMPLETE

Fig. 7A

BEFORE PRIORITY CHANGE

| PRINT SEQUENCE | USER I.D. | TIME REQUIRED | PRIORITY |
|---|---|---|---|
| 1 | 8 | 10 MIN | HIGHEST PRIORITY |
| 2 | 4 | 15 MIN | PRIORITY |
| 3 | 10 | 23 MIN | NORMAL |
| 4 | 5 | 18 MIN | NORMAL |

Fig. 7B

AFTER 1ST PRIORITY CHANGE

| PRINT SEQUENCE | USER I.D. | TIME REQUIRED | PRIORITY |
|---|---|---|---|
| 1 | 8 | 10 MIN | HIGHEST PRIORITY |
| 2 | 4 | 15 MIN | PRIORITY |
| 3 | 5 | 18 MIN | PRIORITY |
| 4 | 10 | 23 MIN | NORMAL |

Fig. 7C

AFTER 2ND PRIORITY CHANGE

| PRINT SEQUENCE | USER I.D. | TIME REQUIRED | PRIORITY |
|---|---|---|---|
| 1 | 8 | 10 MIN | HIGHEST PRIORITY |
| 2 | 5 | 18 MIN | HIGHEST PRIORITY |
| 3 | 4 | 15 MIN | PRIORITY |
| 4 | 10 | 23 MIN | NORMAL |

*Fig. 10*

```
AUTOMATIC PRINT FILE APPEARS IN FILES

PRINT ACCORDING TO ORDER INFORMATION    INPUT 1
SET ORDER AGAIN                         INPUT 0
```

*Fig. 11*

```
66 MINUTES TO PRINT END
QUICK PRINT DESIRED?
                    YES    INPUT 1
                    NO     INPUT 0
```

*Fig. 12*

```
28 MINUTES TO PRINT END
PRINT EXECUTION DESIRED?
                    YES    INPUT 1
                    NO     INPUT 0
```

Fig. 17

ORDER FILE

{
Table_ID = 05
Order_TYPE = COOKING
QUANTITY = 1
MENU = COFEE

Order_TYPE = PRINT
QUANTITY = 8
FILE = ¥IMAGES¥IMG00003.JPG
Order_TYPE = PRINT
QUANTITY = 4
FILE = ¥IMAGES¥IMG00004.JPG
}

Fig. 19

| MEAL | COOKING TIME REQUIRED | | | | TIME TO TAKE MEAL (ON AVERAGE) | | | |
|---|---|---|---|---|---|---|---|---|
| | 11:30 | 14:00 | 17:00 | 19:00 | 11:30 | 14:00 | 17:00 | 19:00 |
| SET LUNCH A | 10MIN | 8MIN | 12MIN | 10MIN | 15MIN | 10MIN | 15MIN | 20MIN |
| SET LUNCH B | 10MIN | 8MIN | 12MIN | 10MIN | 15MIN | 10MIN | 15MIN | 20MIN |
| SET LUNCH C | 10MIN | 8MIN | 12MIN | 10MIN | 15MIN | 10MIN | 15MIN | 20MIN |
| CURRY | 5MIN | 3MIN | 8MIN | 5MIN | 15MIN | 10MIN | 15MIN | 20MIN |
| BUCKWHEAT NOODLE | 5MIN | 3MIN | 8MIN | 5MIN | 15MIN | 10MIN | 15MIN | 15MIN |
| NOODLE | 5MIN | 3MIN | 8MIN | 5MIN | 15MIN | 10MIN | 15MIN | 15MIN |
| COFFEE | 2MIN | 2MIN | 5MIN | 2MIN | 20MIN | 5MIN | 20MIN | 20MIN |
| TEA | 2MIN | 2MIN | 5MIN | 2MIN | 20MIN | 5MIN | 20MIN | 20MIN |
| JUICE | 2MIN | 2MIN | 5MIN | 2MIN | 20MIN | 5MIN | 20MIN | 20MIN |
| ICE CREAM | 2MIN | 2MIN | 5MIN | 2MIN | 20MIN | 5MIN | 20MIN | 20MIN |

PRINT ORDER SYSTEM AND METHOD

CROSS-REFERENCE TO RELATED APPLICATIONS

This application is a Divisional of application Ser. No. 09/612,093, filed on Jul. 7, 2000, and for which priority is claimed under 35 U.S.C. § 120; and this application claims priority of Application No. 11-195434 filed in Japan on Jul. 9, 1999 under 35 U.S.C. § 119; the entire contents of all are hereby incorporated by reference.

BACKGROUND OF THE INVENTION

1. Field of the Invention

The present invention relates to a print order system and a method of the same, a print order device and a method of the same, a print processing device and a print processing method, a meal order system, a device for and a method of ordering a meal, and a device for and a method of receiving a meal order.

2. Description of Related Art

Development of use of digital cameras, personal computers, and printers makes it possible for a user to fetch an image shot by a digital camera into a personal computer and to print the image on a sheet of paper by a printer for family use.

However, such a family printer is low-priced and hence has not sufficiently high resolution. When an image of high resolution is required, the user must record image data representing the image to be printed on a recording medium such as a memory card and then the user brings the card to a laboratory having a high-resolution printer. In the laboratory, the printer reads the image from the card and produces a high-resolution printout or print of the image.

To obtain a printout of high resolution, the user must bring the memory card to the laboratory. Namely, the user cannot easily produce a high-resolution printout of the image.

SUMMARY OF THE INVENTION

It is therefore an object of the present invention to provide a method for the user to relatively easily order a printout of an image.

In accordance with a first aspect of the present invention, there is provided a print order system including a print order device and a printing device which can mutually communicate data therebetween, and preferably which have a one-to-one correspondence therebetween.

The print order device includes image data transmitting means (device) for transmitting, to the print processing device corresponding thereto, image data representing an image to be printed and order data transmitting means (device) for transmitting order data including a number of print copies of the image to be printed to the print processing device in correlation with the image data transmitted from the image data transmitting means.

The print processing device includes image data receiving means (device) for receiving the image data transmitted from the image data transmitting means of the print order device, order data receiving means (device) for receiving the order data transmitted from the order data transmitting means of the print order device, and printer control means (device) for controlling a printer to print an image represented by the image data received by the image data receiving means, according to the order data received by the order data receiving means.

The present invention provides with the above print order device and the above print processing device.

The first aspect of the present invention also provides a method suitable for the print order device of the system above. Namely, there is provided a print order method for use with a print order device which can mutually communicate data with a print processing device. The method includes the steps of transmitting, to the print processing device corresponding thereto, image data representing an image to be printed and transmitting order data including a number of print copies of the image to be printed to the print processing device in correlation with the image data.

Moreover, the first aspect of the present invention provides a method suitable for the print processing device of the system. Namely, there is provided a print processing method for use with a print processing device which can mutually communicate data with a print order device in a print order system. In the print order system, image data representing an image to be printed and order data including a number of print copies of the image to be printed are transmitted from the print order device to the print processing device in correlation with each other. The method comprises the steps of receiving the image data and the order data transmitted from the print order device, and controlling a printer to print an image represented by the image data, according to the order data.

In accordance with the first aspect of the present invention, preferably, a one-to-one correspondence exists between the print order device and the print processing device. The print order device transmits the image data representing an image to be printed and the order data to the print processing device.

When the print processing device receives the image data and the order data, the printer is controlled to print the image represented by the image data according to the order data.

When the print order device is installed at a place where users can operate or use such as a convenience store or a supermarket and the print processing device is placed at a position, where store clerks can operate or use, for example, within a counter of the convenience store or the supermarket, the user can relatively easily order printouts of images.

The print processing device may further include calculating means for calculating a print end time of the printer according to the image data transmitted from the image data transmitting means of the print order device, the order data transmitted from the order data transmitting means of the print order device, and an order reception state of the printer.

In such a situation, an operator near the print processing device will notify the print end time to the user. The user accordingly knows a period of time available, for example, for shopping by the print end time and hence can efficiently use her or his time.

The printer order reception state includes, for example, the number of image copies to be printed by the printer.

The print processing device may further include end time data transmitting means for transmitting, to the print order device, data representing the print end time calculated by the calculating means.

The print end time data is sent to the print order device. Consequently, if the user is in front of the print order device, the end time can be notified directly to the user, not via the operator.

Furthermore, the print processing device may include print charge calculating means for calculating a print charge according to the image data transmitted from the image data transmitting means of the print order device and the order data transmitted from the order data transmitting means of the print order device.

The user can know the print charge. If necessary, the user orders a reduced number of print copies to lower the print charge.

When the printer control means controls the printer to print out in a print sequence according to a sequence of receiving of the order data by the order data receiving means, the print order device may further include change instruction transmitting means for transmitting an instruction to change the print sequence to the print processing device. The print processing device may include print sequence changing means for changing the print sequence according to the change instruction transmitted from the change instruction transmitting means of the print order device.

The user can change the print order when the available time is running out.

In accordance with a second aspect of the present invention, there is provided a meal order system including a meal order device for transmitting data representing a meal ordered by a guest and data identifying a seat of the guest, and an order receiving device for receiving the data transmitted from the meal order device. The meal order device and the meal order receiving device can mutually communicate data with each other.

The meal order device includes image data reading means (device) for reading image data representing an image to be printed from a recording medium, image data transmitting means (device) for transmitting, to the order receiving device corresponding thereto, the image data read by the image reading means in correlation with the meal order data and the seat identifying data; and order data transmitting means (device) for transmitting order data including a number of print copies of the image to be printed to the order receiving device in correlation with the image data transmitted from the image data transmitting means.

The order receiving device includes image data receiving means (device) for receiving the image data transmitted from the image data transmitting means of the print order device, order data receiving means (device) for receiving the order data transmitted from the order data transmitting means of the print order device, and printer control means (device) for controlling a printer to print an image represented by the image data received by the image data receiving means, according to the order data received by the order data receiving means.

The second aspect of the present invention also provides a method suitable for the meal order device of the system. Namely, there is provided a meal order method for use with a meal order device capable of communicating with an order receiving device in a meal order system. The method includes the steps of transmitting data representing a meal ordered by a guest and data identifying a seat of the guest, reading image data representing an image to be printed from a recording medium; transmitting, to the order receiving device corresponding thereto, the image data of the image in correlation with the meal order data and the table number; and transmitting order data including a number of print copies of the image to be printed to the order receiving device in correlation with the image data transmitted from the meal order device.

In accordance with the second aspect of the present invention, there is provided a method for use with an order receiving device capable of mutually communicating data with a meal order device in a meal order system, wherein data representing a meal ordered by a guest, data identifying a seat of the guest, image data representing an image to be printed, and order data including a number of print copies of the image to be printed are transmitted from the meal order device to the order receiving device in correlation with each other. The method comprises the steps of receiving the ordered meal data from the meal order device, receiving the image data and the order data transmitted from the meal order device; and controlling a printer to print an image represented by the image data received, according to the order data.

According to the second aspect of the present invention, the meal order device transmits the data representing a meal ordered by a guest, the table number as well as the image data representing the image to be printed and the order data to the order receiving device.

The order receiving device receives the image data and the order data. The printer is controlled to print the image represented by the image data according to the order data.

The user can order a meal and printouts of images at the same time.

Since the order receiving device receives data to identify a seat of a guest (data representing a seat number or data representing a table number), the charge of meals and the print charge can be settled at the same time.

According to the meal order data, a prediction time at which the guest finishes the meal may be beforehand determined for the meal ordered. Therefore, the printer can be controlled to complete the ordered image print at the prediction time of meal end.

BRIEF DESCRIPTION OF THE DRAWINGS

The objects and features of the present invention will become more apparent from the consideration of the following detailed description taken in conjunction with the accompanying drawings in which:

FIG. 5 is a diagram showing the contents of an automatic print file;

FIG. 6 is a diagram showing the contents of a history file;

FIGS. 7A to 7C are diagrams showing the contents of print queue tables;

FIGS. 10 to 12 are diagrams showing examples of a display screen;

FIG. 17 is a diagram showing the contents of an order file;

FIG. 19 is a table showing a relationship between meals, meal cooking time, and average time to take meal.

DESCRIPTION OF THE PREFERRED EMBODIMENTS

First Embodiment

Figure 1:
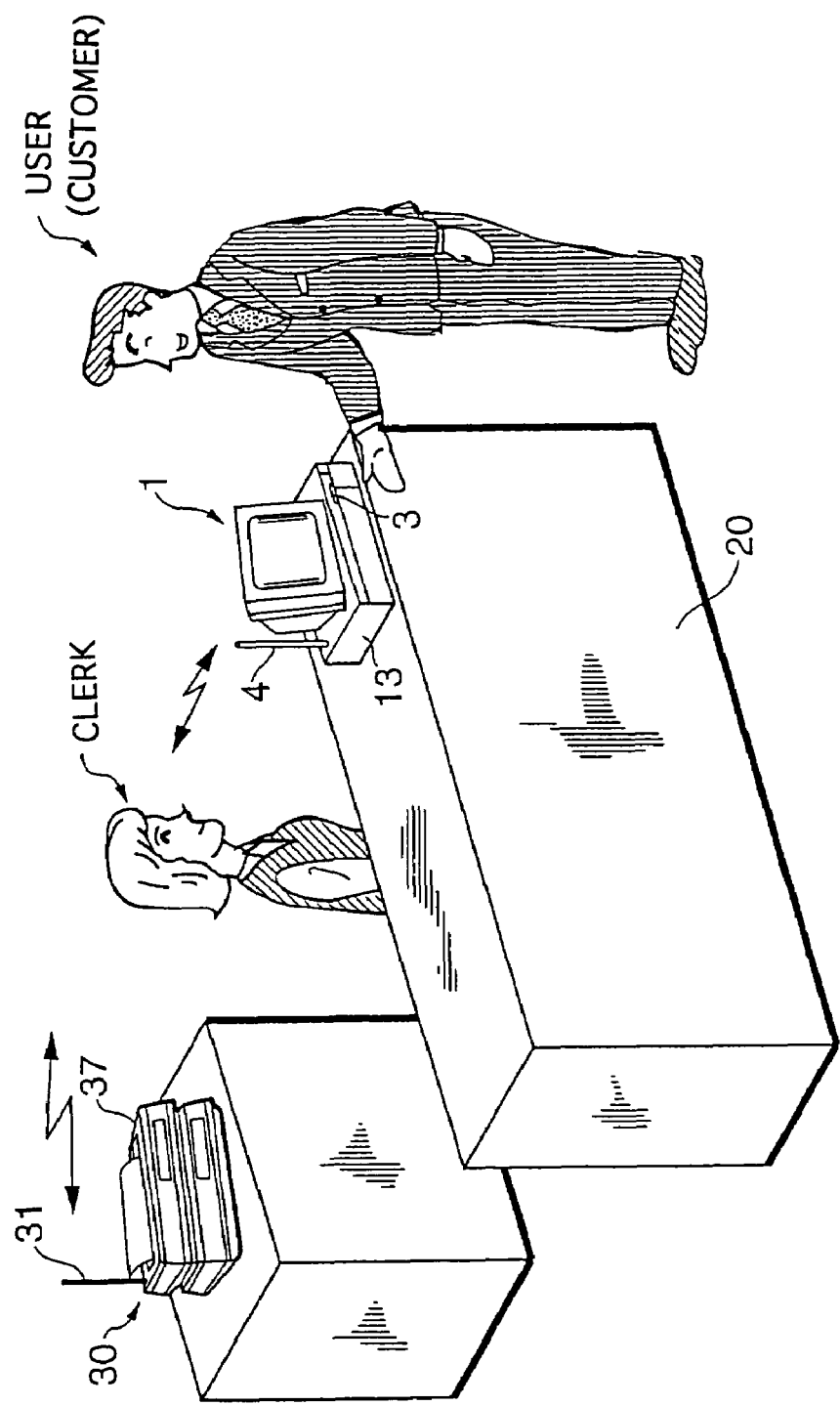
FIG. 1 is a perspective view of a scene in a convenience store.

FIG. 1 shows in a perspective view an embodiment of the present invention, namely, an outline of a print order system installed in a convenience store.

A print order device 1 to order prints of images is installed on a counter 20 in a convenience store.

In the print order device 1, a monitor (display device) 2 is placed on a body thereof 13. The monitor 2 includes a touch panel on its display screen. A memory card insertion slit (slot) 3 is formed in a front surface of the body 13. An antenna 4 is arranged at an edge of the body 13.

Installed in another counter is a print order receiving device (receiver) 30.

The print order receiver 30 includes an antenna 31 and a printer 37.

While a user or a customer operates the print order device 1, a store clerk operates the print order receiver 30. Depending on cases, the store clerk may operate the print order device 1 and the print order receiver 30.

A user brings a memory card in which image data representing an image to be printed is stored and comes to the print order device 1. The user inserts the memory card into the memory card insertion slit 3 of the print order device 1 and orders printouts. The device 1 then sends the print order data to the print order receiver 30. The receiver 30 produces prints of the image according to the order. The store clerk passes the obtained printouts of images to the user. The user receives the printouts and pays the print charge. Details of print order processing will be described below.

Figure 2:
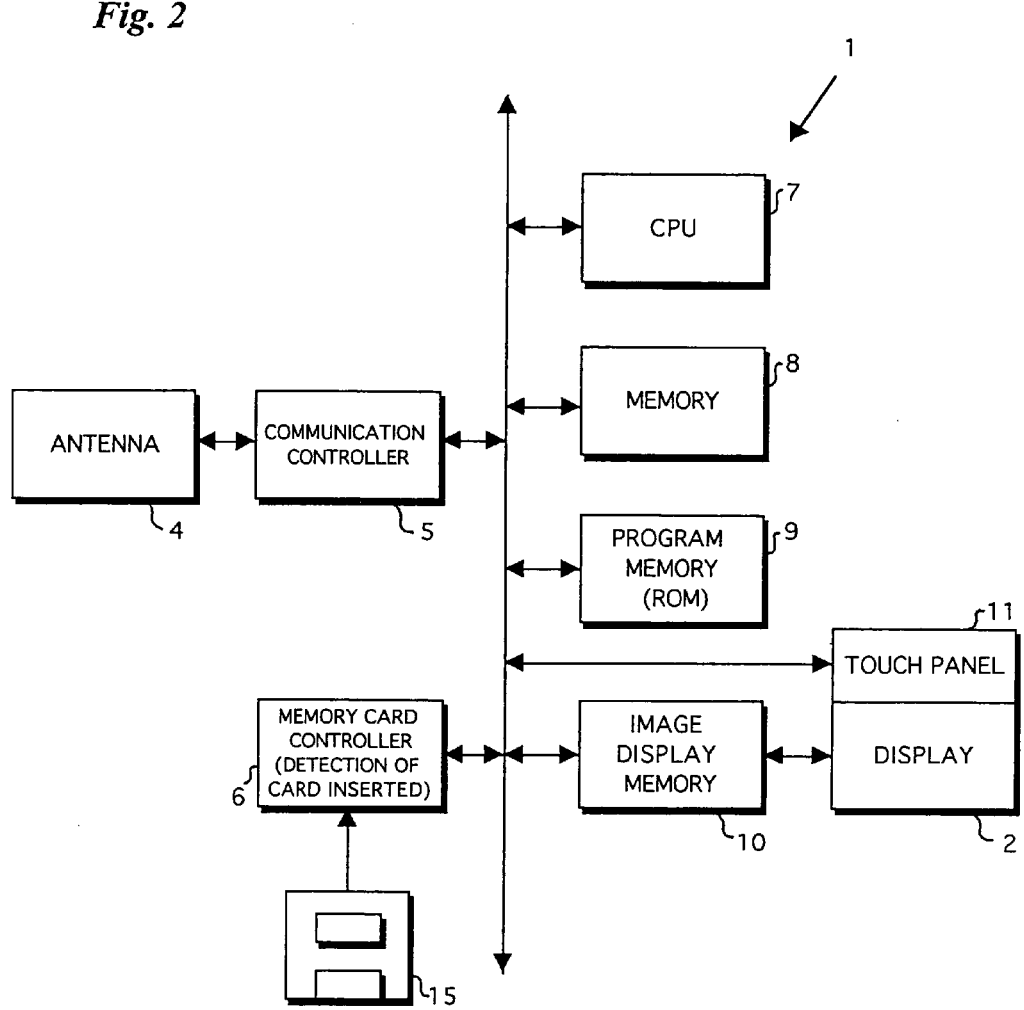
FIG. 2 is a block diagram showing an electric configuration of a print order device.

FIG. 2 shows in a block diagram an electric construction of the print order device 1.

A central processing unit (CPU) 7 supervises the overall operation of the print order device 1.

The device 1 includes a program memory 9 to store an operation program thereof. The device 1 includes a memory 8 to temporarily store data and an image display memory 10 to display an image for a print order on a display screen of the monitor 2. As above, the monitor 2 includes the touch panel 11 on the display screen.

The printer order device 1 includes a memory card control circuit 6 which detects insertion of a memory card 15 through the slit 3 and which controls image data read and write operation in the memory card 15. The device 1 also includes a communication control circuit 5 to transmit data via the antenna 4 to the print order receive 30.

Figure 3:
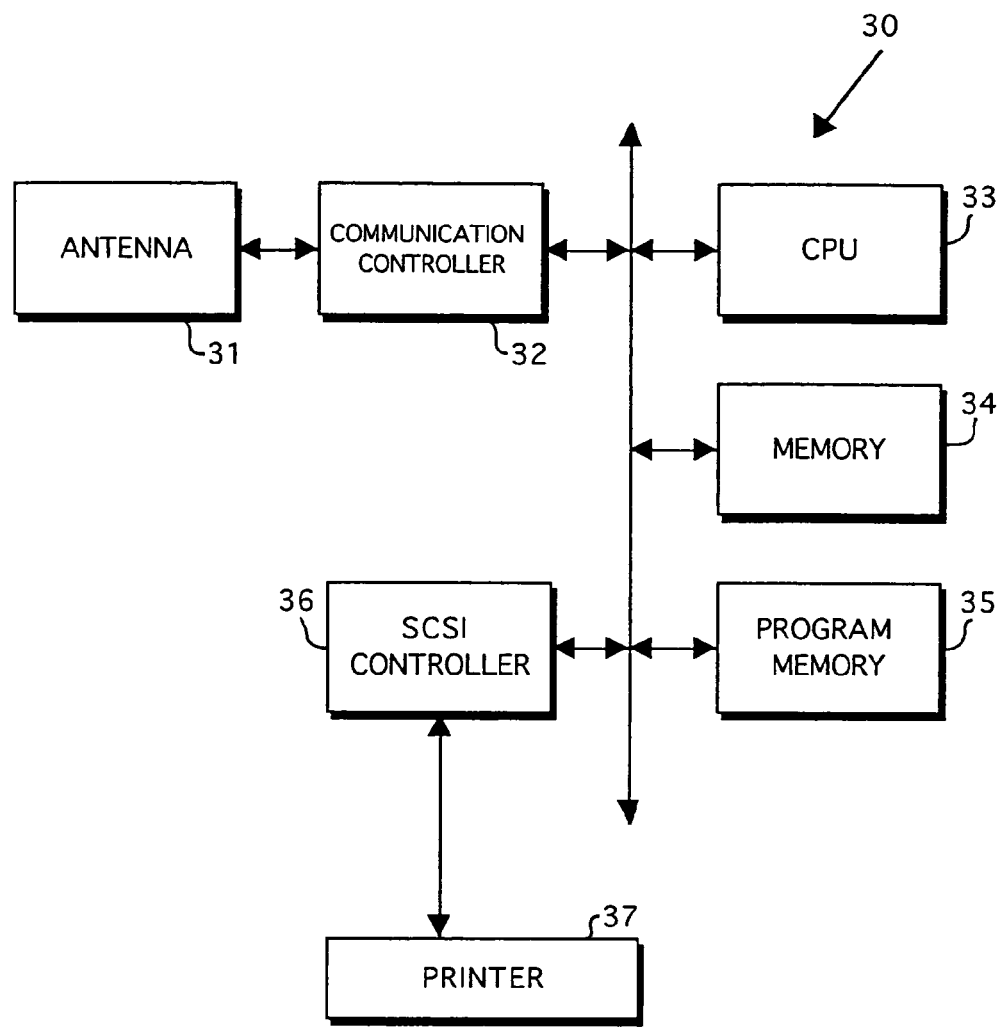
FIG. 3 is a block diagram showing an electric configuration of a print order receiving device.

FIG. 3 shows in a block diagram an electric structure of the print order receiver 30.

A CPU 33 controls the overall operation of the receiver 30.

The receive 30 includes a program memory 35 to store an operation program thereof. The receiver 30 also includes a memory 34 to temporarily store data and a small computer system interface (SCSI) controller 36 to control a printer 37. The receiver 30 includes a data transmitter and receiver (communication control) circuit 32 to control data communication via the antenna 31.

Figure 4:
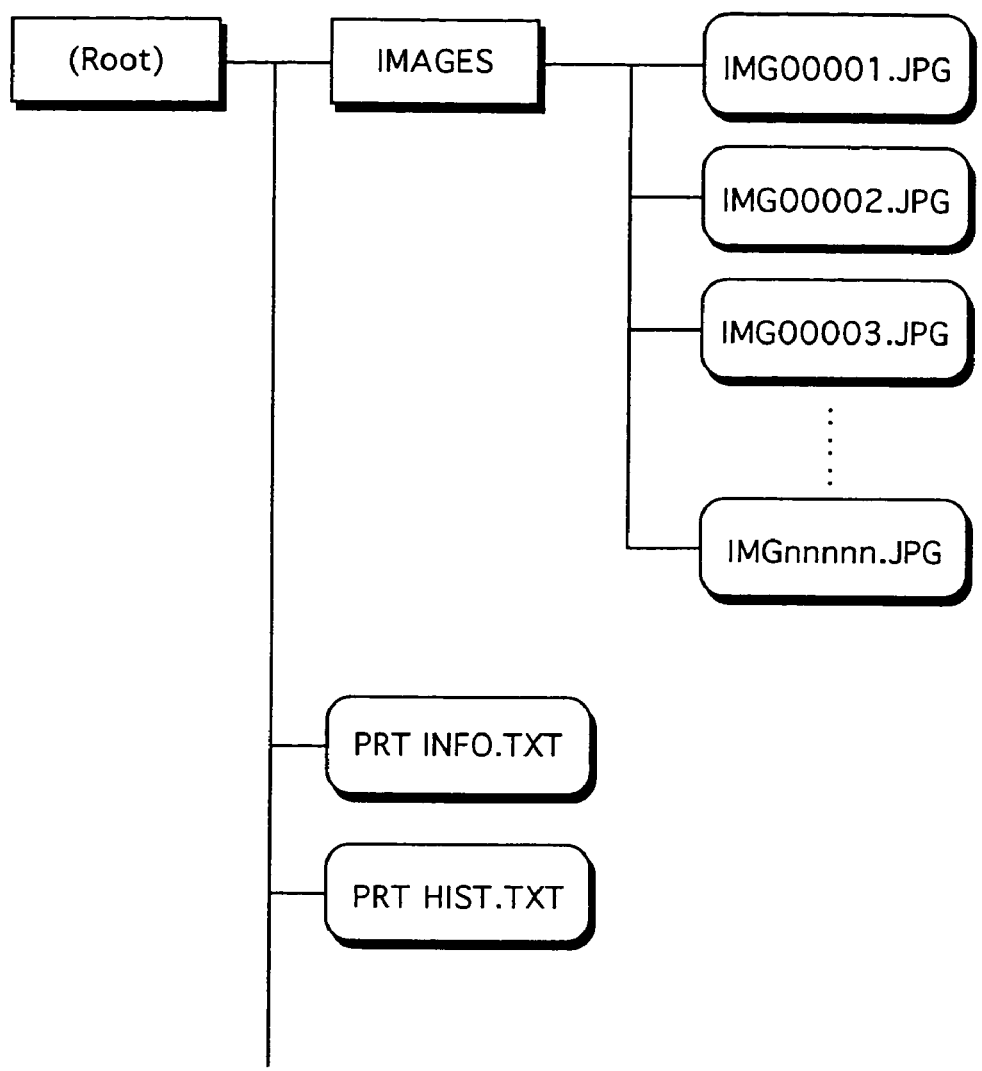
FIG. 4 is a diagram showing a file configuration of a memory card.

FIG. 4 shows a file configuration of the memory card 15 of the user.

File name "IMAGES" controls image files having file names ranging from "IMG00001.JPG" to "IMGnnnnn.JPG". "Root" controls the file name "IMAGES", automatic print file "PRT INFO.TXT" and history file "PRT HIST.TXT".

FIG. 5 shows an example of the contents of an automatic print file.

The automatic print file is a file to store image print order data. This file is generated by a personal computer of the user in her or his house.

The automatic print file of FIG. 5 includes NN data items for print order.

"JOB ID" identifies one unit of the print. "TYPE" indicates picture quality of print images. "STANDARD" indicates standard picture quality. "QUANTITY" represents the number of copies to be printed. "FILE" designates a path to image data representing an image to be printed. For example, {JOB ID=01, TYPE=STANDARD, QUANTITY=1, FILE=¥IMAGES¥IMG0001.JPG} indicates "produce one copy of an image represented by an image file with file name IMG0001.JPG in the standard picture quality".

FIG. 6 shows the contents of a history file.

This history file includes data representing history of an automatic print file (the history file and the automatic print file correspond to each other).

"AUTO FILE DATETIME" contains data indicating a time stamp of an automatic print file. "AUTO STATUS" contains an automatic print status, i.e., "ORDER (automatic print has not been completed, yet)" or "COMPLETE (automatic print has been completed)".

FIGS. 7A to 7C show an example of the contents of print queue tables employed in print processing of the print order receiver 30.

The print queue table indicates a print sequence.

Stored in the print queue table are a print sequence, a user identifier (ID), print time required for the user, and print priority of the user. The user ID is an identifier unique to the user. In this embodiment of a print order system, the print operation is fundamentally accomplished in the order in which a print order is inputted in the print order device 1. However, the print sequence can be altered. The priority is used for this purpose. Details of the print sequence change will be described later. The print queue table of FIG. 7A shows an initial state before alteration of the print sequence. The table of FIG. 7B is a state after a print sequence change. The table of FIG. 7C shows a state after further print sequence change.

Figure 8:
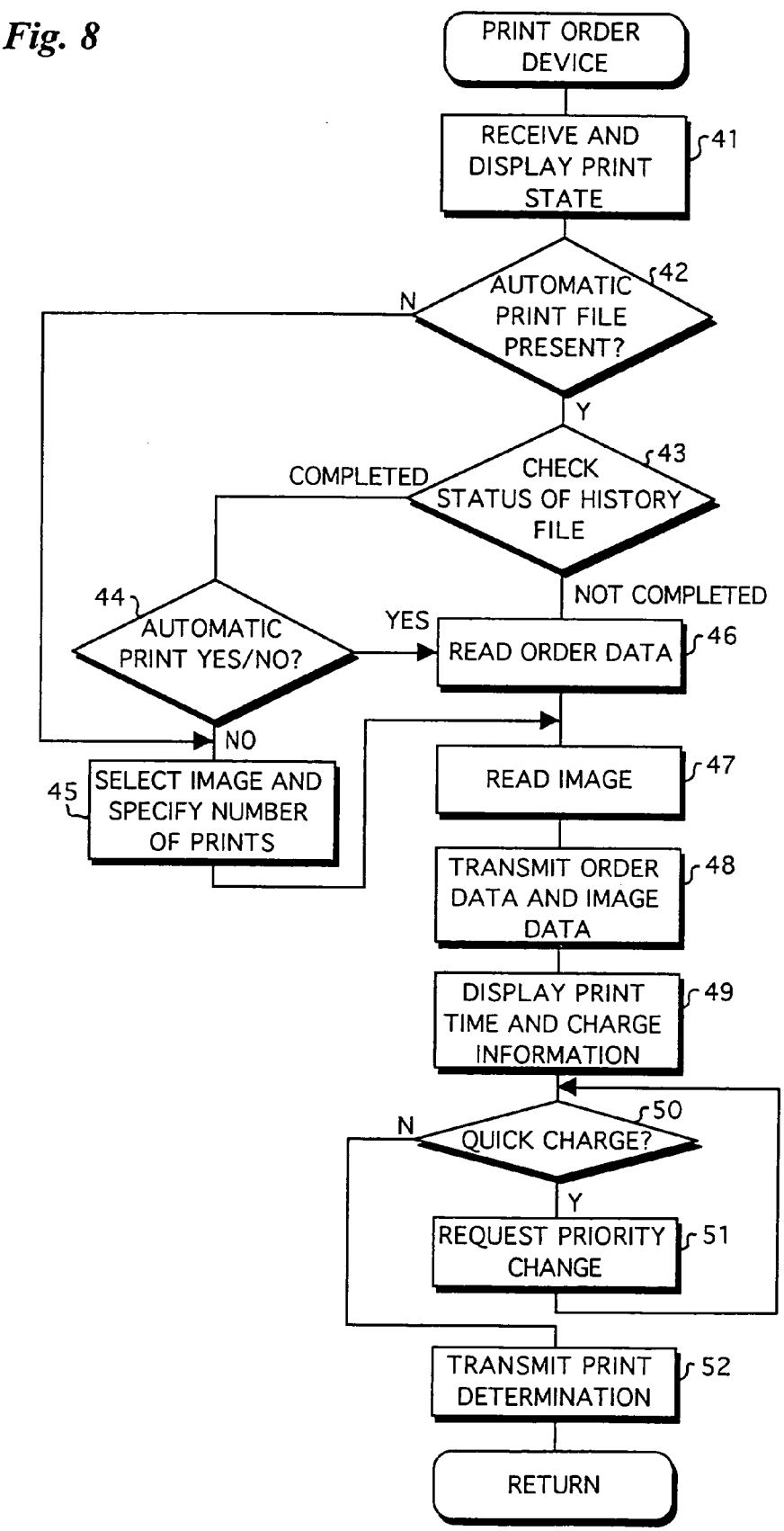
FIG. 8 is a flowchart showing a processing procedure of print order processing in the print order device.
Figure 9:
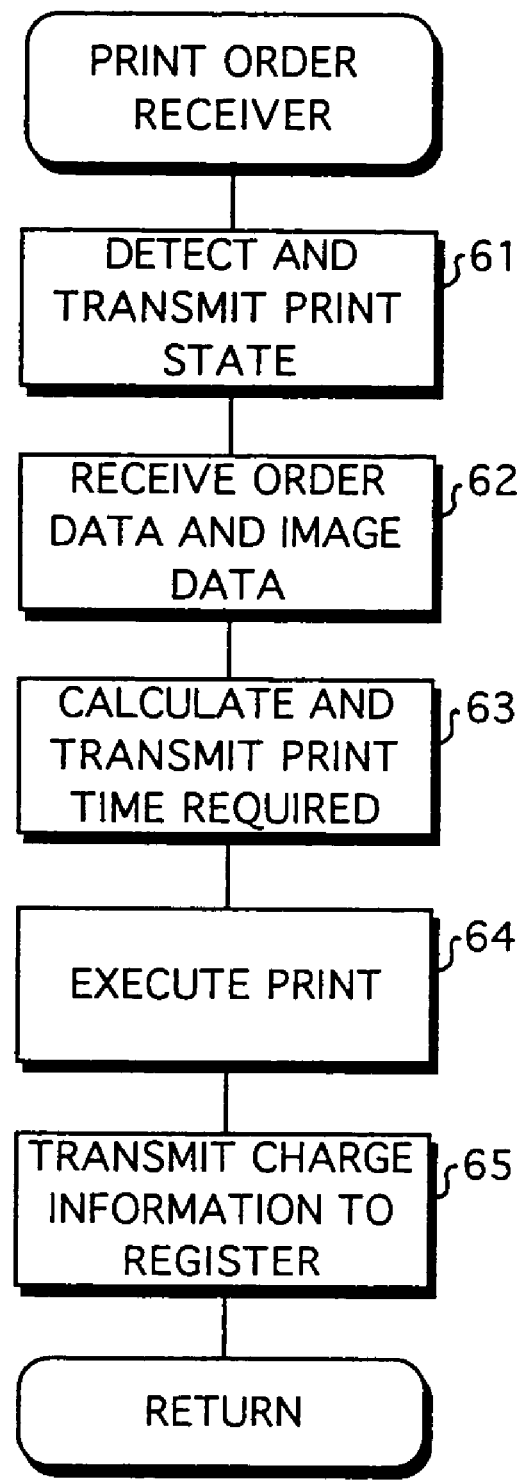
FIG. 9 is a flowchart showing a processing procedure of print order processing in the print order receiving device.

FIG. 8 shows in a flowchart a processing procedure of the print order device 1. FIG. 9 shows in a flowchart a processing procedure of the print order receiver 30. FIGS. 10 to 12 show an example of display screens on the monitor of the print order device 1.

When a user inserts a memory card in the device 1, the device 1 transmits data indicating the card insertion to the print order receiver 30.

Having received the data indicating insertion of the card 15 in the print order receiver 30, the receiver 30 detects a print state of the printer 37, whether or not the printer 37 is in a printing state, a period of time required to end the printing if the printer is in the printing state, and a number of remaining images to be printed (step 61). The device 30 transmits the print state data detected to the print order device 1.

When the device 1 receives the data indicating the print states, the monitor 2 displays on its display screen the print states of the receiver 30 (step 41).

A check is made to confirm whether or not the memory card 15 inserted into the device 1 includes an automatic print file (step 42). If such a file is present (YES in step 42), the program references the history file to check a status in the file (step 43). If the status of the history file indicates "COMPLETE, i.e., completed", the monitor 2 displays on its display screen a confirmation message to determine whether or not the order (automatic print) is conducted according to the order data stored in the automatic print file (step 44). As shown in FIG. 10, the monitor display 2 presents on its display screen a confirmation image to determine whether or not an automatic print is carried out.

If the automatic print is not desired, the operator (the clerk or user) inputs "0" from a keypad of the print order device 1. Image data recorded in the memory card 15 is then read such that reduced images (thumbnail images) represented by the read image data are displayed as a list on the display screen of the monitor 2. The user touches a desired image to be printed in the list. The user inputs the number of copies of the image (step 45). Naturally, a ten-key keypad is displayed on the display screen of the monitor 2 to input the number of copies.

When the image(s) to be printed and the number(s) of copies thereof are specified, image data of the specified image is read from the memory card 15 (step 47). The image data is temporarily stored in the memory 8 of the print order device 1.

If the card 15 inserted in the device 1 includes an automatic print file (YES in step 42) and the state of the file recorded in the history file indicates "ORDER, i.e., not completed" (step 43), the print order is conducted according to the order data recorded in the automatic print file. For this purpose, the order data is read from the automatic print file (step 46). The print order data is temporarily stored in the memory 8. Image data specified by the order data is read from the memory card 15 to be temporarily stored in the memory 8 (step 47).

Even if the status check of the history file indicates "COMPLETE, i.e., completed" and the print of the image(s) using the automatic print file has been terminated, the user may again order the print using the contents of order data recorded in the automatic print file in some cases. In such a situation, while the automatic print confirmation image is being displayed as shown in FIG. 10, the user inputs "1" from the keypad of the print order device 1 (step 44). The order data is read from the automatic print file (step 46). Image data is read from the memory card 15 according to the order data (step 47).

If the memory card 15 inserted in the print order device 1 does not include an automatic print file, the status check of the file is not conducted, and the user may select a desired image(s) to be printed and input the number(s) of copies of the image(s) (NO in step 42; step 45).

The communication controller 5 transmits the image data and the order data temporarily stored in the memory 8 (when the user specifies the image to be printed and the number of copies in step 45, the data representing the contents specified by the user is the order data) via the antenna 4 to the print order receiver 30 (step 48).

The antenna 31 of the receiver 30 receives the image data and the order data (step 62). These data items received are temporarily stored in a memory 34 via the communication controller 32. According to the order data, the print order receiver 30 calculates print time required (step 63).

The print time required is calculated, for example, as follows.

$$\text{Print time required} = \text{Remaining print time required} + \text{Number of copies ordered} \times \text{Print time per copy} \quad (1)$$

Assume that the remaining print time required is ten minutes, the number of copies is 20, and the print time per copy is 30 seconds. The print time required is obtained as 10 min+20×30 sec=20 min.

The print order receiver 30 transmits the data indicating the print time calculated to the print order device 1 (step 63).

Having received the data of the print time required, the print order device 1 displays the print time on the display screen of the monitor 3 (step 49). FIG. 11 shows an example of the display screen.

Displayed on the display screen of the monitor 3 is the print time required (66 minutes in the example shown in FIG. 11) and a message to confirm whether or not a quick print (processing to change the print priority as above) is achieved.

As above (FIG. 7A), if the user ID of the current print ordering person is "5" and the print sequence of the print order is "4", the time which lapses by when the print is finished for the print order is 10 min+15 min+23 min+18 min=66 min in consideration of the orders already ordered. The period of time is displayed as the print time required on the display screen of the monitor 2 of the print order device 1.

The quick print can reduce the time which lapses by when the print is terminated. For the quick print, a quick print charge is added to the ordinary print charge. A message indicating the addition of the quick print charge for the quick print is displayed on the display screen of the monitor 2 of the print order device 1. Having visually confirmed the quick print charge displayed on the screen, the user determines whether or not the quick print is desired. To achieve the quick print, the user inputs a pertinent instruction, i.e., "1" from the ten-key keypad on the display screen to the print order device 1 (YES in step 50). This generates a priority change request command. The device 1 sends the command to the print order receiver 30 (step 51).

When the receiver 30 receives the priority change request command, the priority of the user having issued the command is increased by one step, i.e., from "normal" to "priority". Using the new priority, the period of time which lapses by the print end of the user is calculated (step 63). The priority increases by one step and the print sequence of user ID "5" is set to 3 as shown in FIG. 7B. The time required by the end of print is 10 min+15 min+28 min=53 min. The print order receiver 30 sends the period of time calculated to the print order device 1.

The time required by the print end for the new priority is displayed on the display screen of the monitor 2 of the print order device 1 (step 49). The user confirms the time. The priority can be further changed in this embodiment. For this operation, another quick charge is required. If the user accepts this condition of the quick charge (YES in step 50), the print order device 1 transmits a priority change command to the print order receiver 30 (step 51).

When the receiver 30 receives the command, the priority of the user is again increased by one step (from "priority" to "highest priority"). The user of user ID "5" has print order "2" in the print as shown in FIG. 7C. Resultantly, the print time required for the user of user ID "5" is 10 min+18 min=28 min. The print order receiver 30 transmits data representing the print time required to the print order device 1 (step 63).

When the print order device 1 receives the data representing the print time, the print time required for the new priority is displayed on the display screen of the display 2 as shown in FIG. 12 (step 49). To issue a print order with the time displayed, the user inputs "1" (NO in step 50). This generates a print determination command. The print order device 1 transmits the print determination command to the print order receiver 30 (step 52). If the print order is not required with the time displayed, the user inputs "0" as guided on the screen.

When the receiver 30 receives the print determination command, the image data and the order data temporarily stored in the memory 34 are read such that the printer 37 prints an image according to the order data (step 64). The receiver 30 transmits data indicating the print charge to a register (e.g., an electronic cash register) of the convenience store (step 65). The print charge is displayed on a display screen of a display of the register. The store clerk watches the print charge and asks the user for the print charge. According to the request, the user pays the print charge.

In the description of the first embodiment, the print order system is placed in a convenience store. However, the system may be installed at any other place.

Second Embodiment

FIGS. 13 to 19 show a second embodiment. This embodiment is an example in which a user or a guest orders prints of pictures in a family restaurant.

Figure 13:
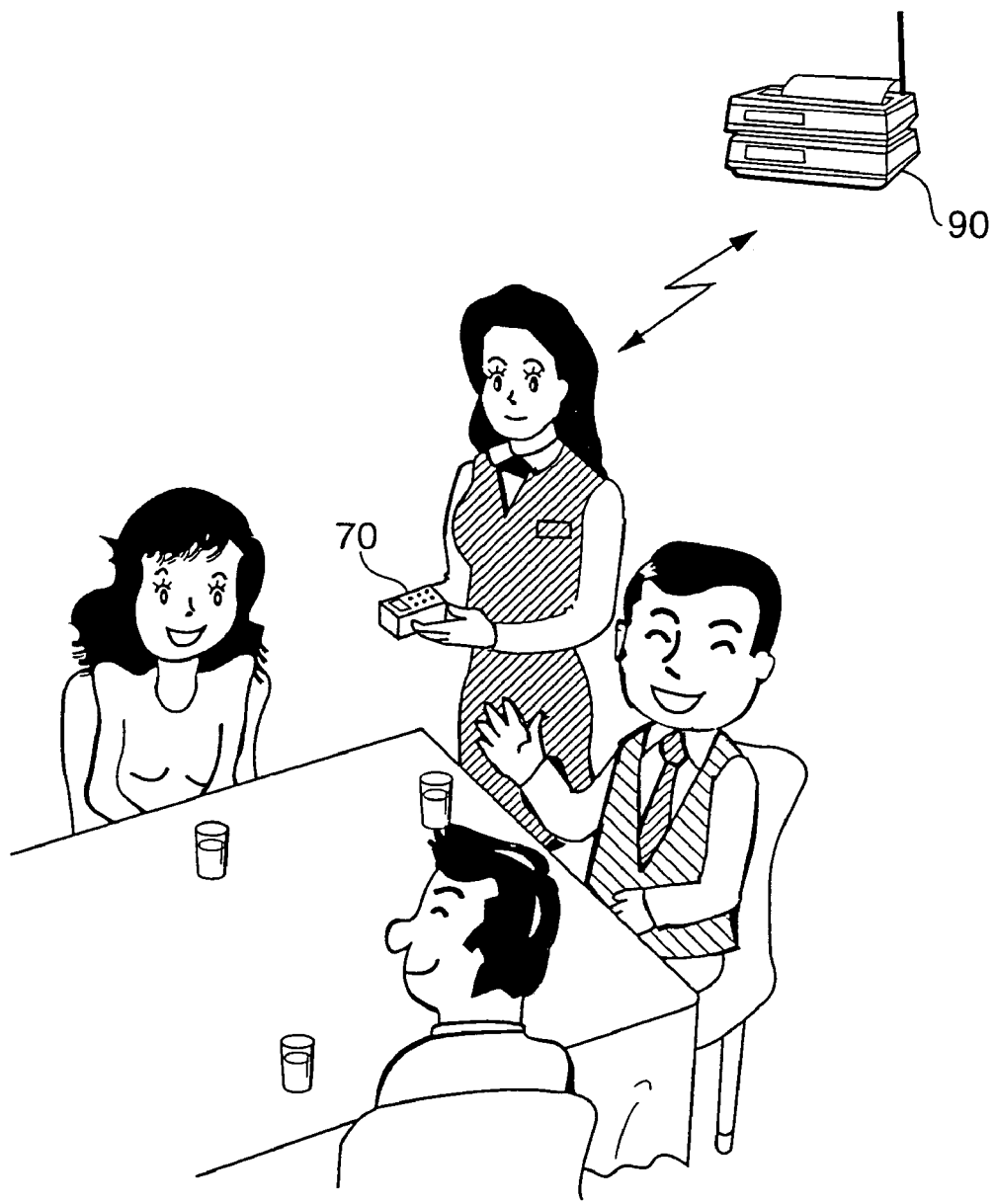
FIG. 13 is a perspective view showing a scene in a family restaurant.

FIG. 13 shows a scene in a family restaurant.

In the restaurant, a waiter or a waitress accepts an order of meals from guests at their table. The waitress inputs items of meals ordered by the guests in a portable meal order device 70 in her hand. Data representing the ordered meals is transmitted from the device 70 to a meal order receiver 90 in, for example, a kitchen. According to the data of the ordered meals received by the device 90, the cook prepares the meals.

The second embodiment utilizes the meal order system above.

Figure 14:
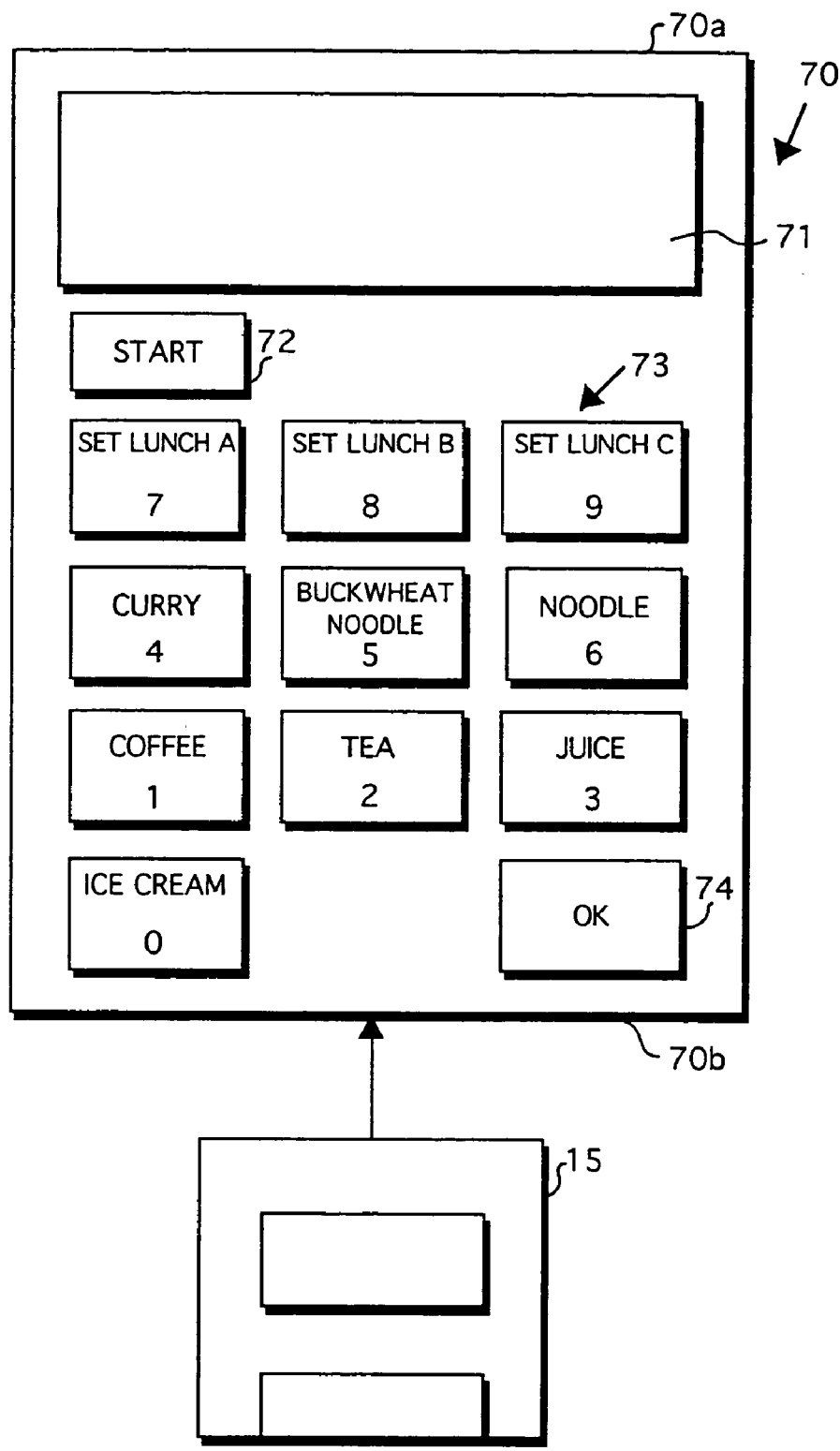
FIG. 14 is a plane view of a meal order device.

FIG. 14 shows a plan view of the meal order device 70.

The device 70 includes keypads 72 to 74 on a surface of a lower section thereof. The keypad 72 is depressed to start inputting a meal order. The keypad 73 is pushed to input a meal name and also functions as a ten-key keypad. The keypad 74 is depressed to terminate the input operation.

The meal order device 70 includes a display screen 71 on its surface of an upper section thereof.

The device 70 includes a lower-edge surface 75 having an insertion slit (slot) (not shown) to insert a memory card 15 into the device 70.

Data indicating a meal ordered is transmitted from an upper-edge surface (an antenna) 76 of the device 70.

By the meal order device 70, the guest can order meals as well as prints of pictures. Details will be described below.

Figure 15:
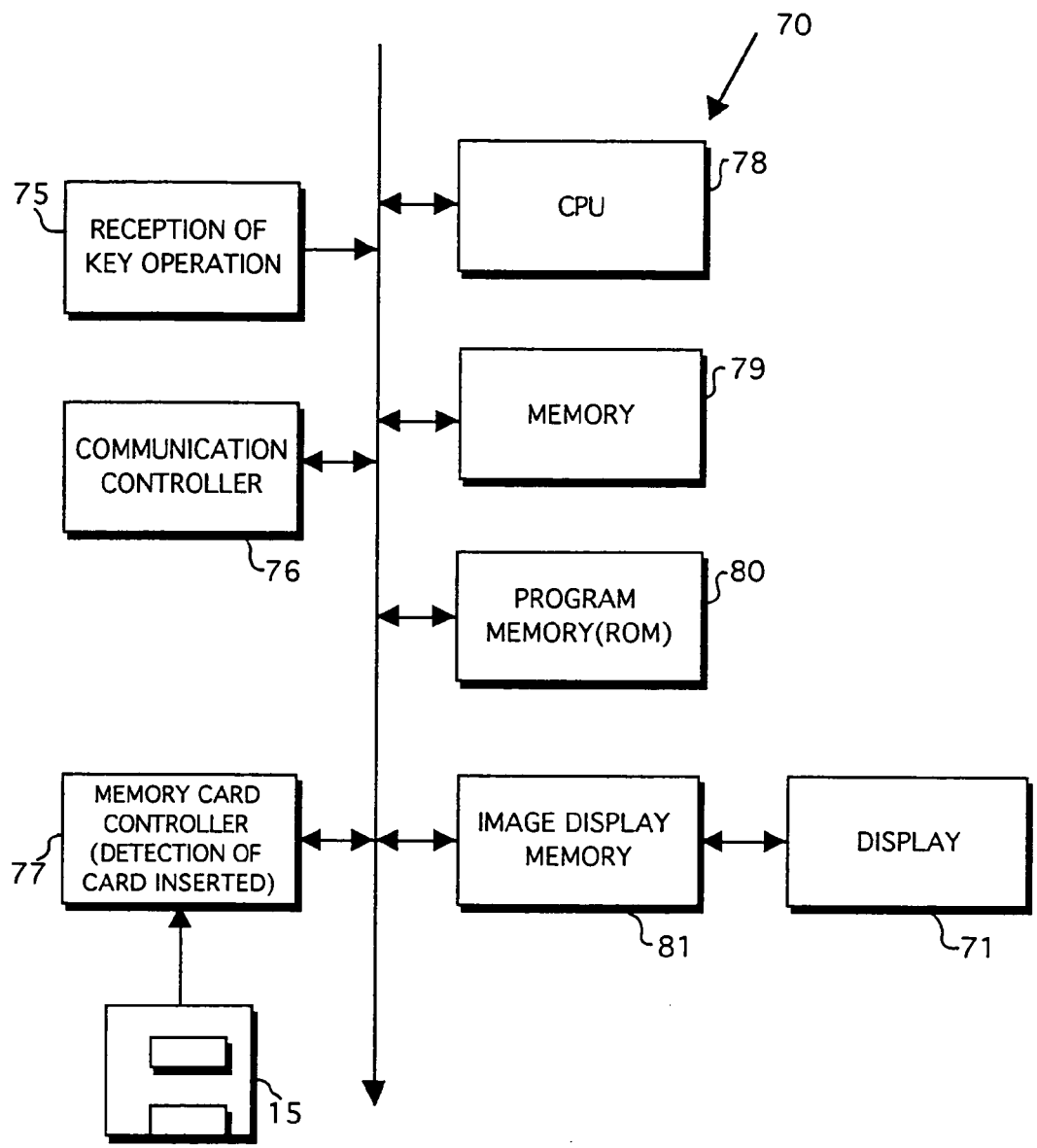
FIG. 15 is a block diagram showing an electric configuration of a meal order device.

FIG. 15 shows in a block diagram an electric configuration of the meal order device 70.

A CPU supervises the overall operation of the device 70.

The device 70 includes a program memory 80 to store an operation program thereof. The device 70 includes a memory 79 to temporarily store data and an image display memory 81 to display an image on a display screen of a display 71 (reference numeral 71 also indicates the display screen).

The meal order device 70 includes a memory card controller 77 which detects a memory card 15 inserted in the device 70 and which controls read and write operations of image data in the memory card 15. The device 70 also includes a communication controller 76 to transmit and receive data, and a panel controller to accept signals from the keypads 72 to 74.

Figure 16:
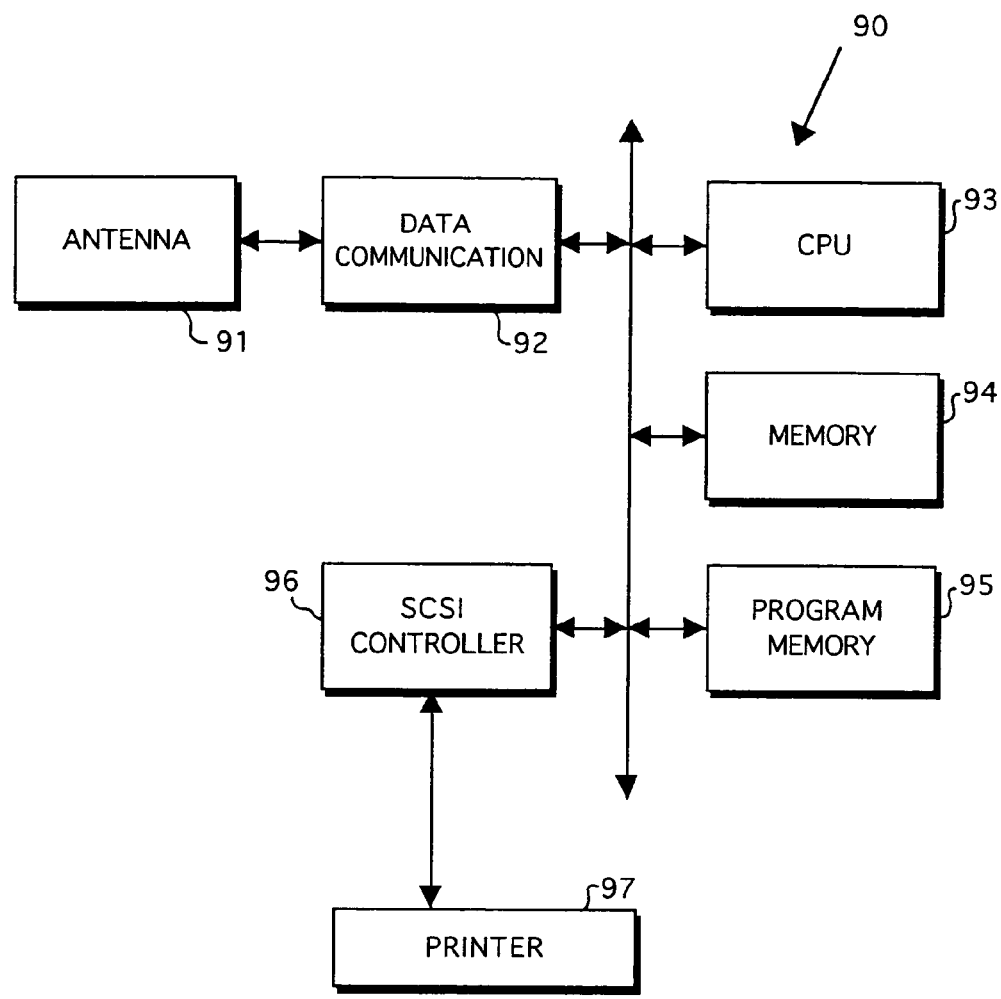
FIG. 16 is a block diagram showing an electric configuration of a meal order receiving device.

FIG. 16 shows in a block diagram an electric structure of the meal order receiver 90.

The device 90 includes a CPU 93 to control the overall operation thereof.

The device 90 includes a program memory 95 to store its operation program. The device 90 includes a memory 94 to temporarily store data and an SCSI controller 96 to control a printer 97. The device 90 includes a data transmitter and receiver (data communication) circuit 92 to control communication of data via an antenna 91.

FIG. 17 shows the contents of an order file generated by the meal order device 70.

This order file reflects a state in which a guest of table number five orders a cup of coffee and orders eight copies of images of file name "IMG00003.JPG" and four copies of images of file name "IMG0004.JPG".

Namely, a waitress comes to the guest of table number five and receives an order of a cup of coffee, eight copies of images of file name "IMG00003.JPG", and four copies of images of file name "IMG0004.JPG". The waitress inputs these orders in the meal order device 70 in a sequence as follows.

① Depress the start keypad 72. ② Depress a key of the same number as the table number of the guest in the keypad 73. ③ Depress a key associated with a meal name ordered in the keypad 73. ④ Depress the OK keypad 74.

The meal has been ordered completely. Items of the order file of FIG. 17 are generated as {Table ID=05, Order Type=COOKING, QUANTITY=1, MENU=COFFEE}. Table ID=05 indicates the table number of the guest. Order Type=COOKING indicates that a meal has been ordered. QUANTITY=1 designates the number of meals ordered. MENU=COFFEE represents the name of ordered meal.

To order prints of pictures, the memory card 15 is inserted into the meal order device 70. The waitress inputs order items for pictures in the following sequence.

⑤ Depress a key of a frame number of an image to be printed in the ten-key keypad 73 (frame number "3", for an image of file name "IMG00003.JPG" and frame number "4" for an image of file name "IMG0004.JPG"). ⑥ Depress a key of a number indicating the number of prints of the image with the frame number in the keypad 73. ⑦ Depress the OK keypad 74.

The image print order has been completed. Items of the order file shown in FIG. 17 are generated as {Order Type=PRINT, QUANTITY=8, FILE=¥IMAGES¥IMG00003.JPG, Order Type=PRINT, QUANTITY=4, FILE=¥IMAGES¥IMG0004.JPG}. Order Type=PRINT indicates that this is an order of picture prints.

Figure 18:
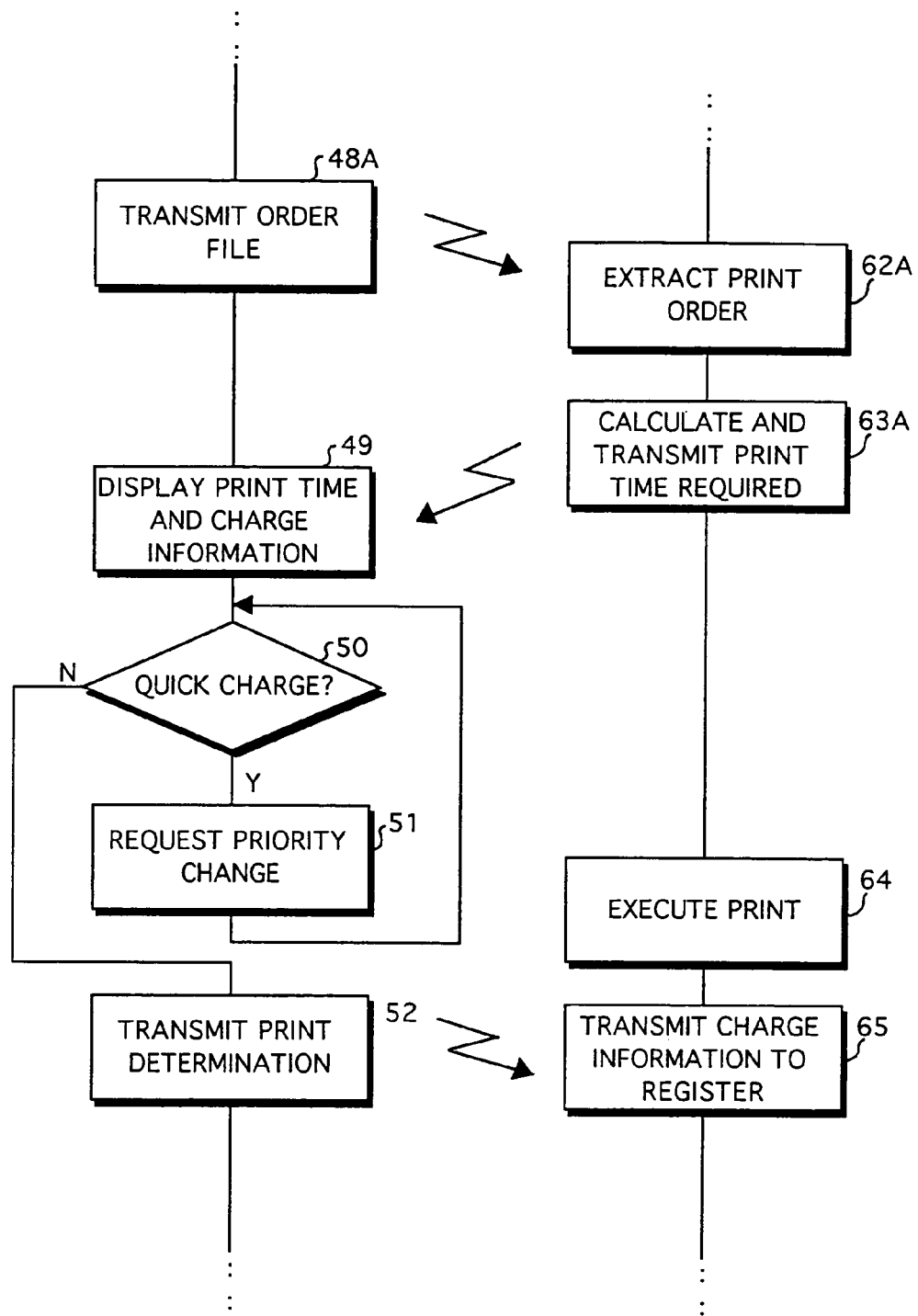
FIG. 18 is a flowchart partly showing a processing procedure of print order processing.

FIG. 18 partly shows in a flowchart a processing procedure of the meal order device and the meal order receiver. In this flowchart, the same steps as those of FIGS. 8 and 9 are assigned with the same reference numerals, and description thereof will be avoided.

The meal order device 70 transmits the order file generated as above to the meal order receiver 90 (step 48A).

Having received the order file, the receiver 90 references the order type thereof and separates the contents into data concerning the meal order and data for the order of picture prints (step 62A). According to the meal order data indicating the meal ordered, the cook prepares the meal. According to the print order data, the receiver 90 calculates the print time required. The receiver 90 transmits the data of print time to the meal order device 70 (step 63A).

As in the first embodiment, the device 70 displays the print time on its display screen. If necessary, the quick print can naturally be achieved.

The print time may be determined in consideration of the meal cooking time and the time required for the guest to take the meal.

FIG. 19 shows a relationship between meals, average time required to prepare meals (cooking time required), and average time to take meals (average time for meal).

The cooking time required and the average time for meal are respectively determined for respective time zones. This is determined in consideration of frequency of orders of each meal of each time zone.

The time in FIG. 19 indicates a value of time when one guest orders one meal. For example, when a guest orders "set lunch A" at a time before half past eleven, the cooking time required is ten minutes and the average time for meal is 15 minutes. Therefore, 25 minutes lapses from when the guest orders the meal to when the guest finishes eating the meal.

When the same meals of the number n are ordered at the same table, the total cooking time required is calculated as follows.

$$\text{Total cooking time required} = \text{Each cooking time required (listed in FIG. 19)} \times (1+(n-1)\times 0.2) \quad (2)$$

When a plurality of persons are at the same table, an average time for meal for persons is calculated as follows.

$$\text{Average time for meal for persons} = \text{Each average time for meal (listed in FIG. 19)} \times 1.5 \quad (3)$$

When a plurality of persons are at the same table, the print time is desirably calculated by adding the total cooking time required and the average time for meal for persons.

When the guests finish the meals, the print operation is completed. When print orders are accepted from a guest having a long period of time to end meals and a guest having a short period of time to end meals, it may also be possible to assign higher priority to the guest having a short period of time to end meals.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A meal order system comprising:
   a meal order device for transmitting data representing a meal ordered by a guest; and
   an order receiving device for receiving the data transmitted from the meal order device, the order receiving device being capable of mutually communicating data with the meal order device, wherein
   the meal order device comprises:
      an image data reading device for reading image data representing an image to be printed from a recording medium;
      an image data transmitting device for transmitting, to the order receiving device corresponding thereto, the image data read by the image reading device in correlation with the meal order data; and
      an order data transmitting device for transmitting order data including a number of print copies of the image to be printed to the order receiving device in correlation with the image data transmitted from the image data transmitting device and
   the order receiving device comprises:
      an image data receiving device for receiving the image data transmitted from the image data transmitting device of the meal order device;
      an order data receiving device for receiving the order data transmitted from the order data transmitting device of the meal order device; and
      a printer control device for controlling a printer to print an image represented by the image data received by the image data receiving device, according to the order data received by the order data receiving device.

2. A meal order system in accordance with claim 1, wherein:
   for an ordered meal represented by the meal order data, the prediction time of end of meal is beforehand determined; and
   the printer control device controls the printer to completely print, at the prediction time of end of meal, the image ordered.

3. A meal order system in accordance with claim 1, wherein
   the meal order device further transmits data identifying a seat of the guest, and
   the image data transmitting device transmits, to the order receiving device corresponding thereto, the image data read by the image reading device in correlation with the meal order data and the seat identifying data.

4. A meal order system in accordance with claim 3, wherein the meal order device, the order receiving device, and the seat of the guest are located in a same restaurant.

5. A meal order system, comprising:
   a meal order device for transmitting data representing a meal ordered by a guest and data; and
   order receiving device for receiving data transmitted from the meal order device, the order receiving device being capable of mutually communicating data with the meal order device, wherein
   the meal order device comprises:
      image data reading means for reading image data representing an image to be printed from a recording medium;
      image data transmitting means for transmitting, to the order receiving device corresponding thereto, the image data read by the image reading means in correlation with the meal order data; and
      order data transmitting means for transmitting order data including a number of print copies of the image to be printed to the order receiving device in correlation with the image data transmitted from the image data transmitting means and
   the order receiving device comprises:
      image data receiving means for receiving the image data transmitted from the image data transmitting means of the meal order device;
      order data receiving means for receiving the order data transmitted from the order data transmitting means of the meal order device; and
      printer control means for controlling a printer to print an image represented by the image data received by the image data receiving means, according to the order data received by the order data receiving means.

6. A meal order system in accordance with claim 5, wherein
   the meal order device further transmits data identifying a seat of the guest, and the image data transmitting means transmits, to the order receiving device corresponding thereto, the image data read by the image reading device in correlation with the meal order data and the seat identifying data.

7. A meal order system in accordance with claim 6, wherein the meal order device, the order receiving device, and the seat of the guest are located in a same restaurant.

8. A meal order device capable of mutually communicating data with an order receiving device in a meal order system, comprising:
   an ordered meal data transmitting device for transmitting data representing a meal ordered by a guest;
   an image data receiving device for reading image data representing an image to be printed from a recording medium;
   an image data transmitting device for transmitting, to the order receiving device corresponding thereto, the image data read by the image data reading device in correlation with the meal order data; and
   an order transmitting device for transmitting order data including a number of print copies of the image to be printed to the order receiving device in correlation with the order data and the image data transmitted from the image data transmitting device.

9. A meal order device in accordance with claim 8, wherein
   the ordered meal data transmitting device further transmits data identifying a seat of the guest, and
   the image data transmitting device transmits, to the order receiving device corresponding thereto, the image data read by the image reading device in correlation with the meal order data and the seat identifying data.

10. A meal order device in accordance with claim 9, wherein the meal order device is located in a same restaurant as the order receiving device and the seat of the guest.

11. A meal order method for use with a meal order device capable of communicating with an order receiving device in a meal order system, comprising the steps of:
   transmitting data representing a meal ordered by a guest;
   reading image data representing an image to be printed from a recording medium;
   transmitting, to the order receiving device corresponding thereto, the image data read from the recording medium in correlation with the meal order data; and
   transmitting order data including a number of print copies of the image to be printed to the order receiving device in correlation with the transmitted order data and the image data.

12. A meal order method in accordance with claim 11, further comprising:
   transmitting data identifying a seat of the guest, wherein the image data read from the recording medium is transmitted, to the order receiving device corresponding thereto, in correlation with the meal order data and the seat identifying data.

13. A meal order method in accordance with claim 12, wherein the seat of the guest and the order receiving device are located in a same restaurant.

14. A meal order device capable of mutually communicating data with an order receiving device in a meal order system, comprising:
   ordered meal data transmitting means for transmitting data representing a meal ordered by a guest;
   image data reading means for reading image data representing an image to be printed from a recording medium;
   image data transmitting means for transmitting, to the order receiving device corresponding thereto, the image data read by the image data reading means in correlation with the meal order data; and
   order data transmitting means for transmitting order data including a number of print copies of the image to be printed to the order receiving device in correlation with the order data and the image data transmitted from the image data transmitting means.

15. A meal order device in accordance with claim 14, wherein
   the ordered meal data transmitting means further transmits data identifying a seat of the guest, and
   the image data transmitting means transmits, to the order receiving device corresponding thereto, the image data read by the image reading device in correlation with the meal order data and the seat identifying data.

16. A meal order device in accordance with claim 15, wherein the meal order device is located in a same restaurant as the order receiving device and the seat of the guest.

17. An order receiving device capable of mutually communicating data with a meal order device in a meal order system in which
   data representing a meal ordered by a guest, image data representing an image to be printed, and order data including a number of print copies of the image to be printed are transmitted in correlation with each other, the order receiving device comprising:
   an ordered meal data receiving device for receiving the ordered meal data transmitted from the meal order device;
   an image data receiving device for receiving the image data transmitted from the meal order device;
   an order data receiving device for receiving the order data transmitted from the meal order device; and
   a printer control device for controlling a printer to print an image represented by the image data received by the image data receiving device, according to the order data received by the order data receiving device.

18. An order receiving device in accordance with claim 17, wherein
   for an ordered meal represented by the meal order data, the prediction time of the end of the meal is predetermined, and
   the printer control device controls the printer to have completely printed the ordered image at the prediction time.

19. A meal order receiving method for use with an order receiving device capable of mutually communicating data with a meal order device in a meal order system, wherein data representing a meal ordered by a guest, image data representing an image to be printed, and order data including a number of print copies of the image to be printed are transmitted from the meal order device to the order receiving device in correlation with each other, the method comprising the steps of:
   receiving the ordered meal data, the image data, and the order data transmitted from the meal order device, and
   controlling a printer to print an image represented by the image data received, according to the order data.

20. A meal order receiving method in accordance with claim 19, further comprising:
   predicting an end time of the meal represented by the ordered meal data, wherein
   the printer is controlled so that the image represented by the image data received has been completely printed at the predicted end time.

21. An order receiving device capable of mutually communicating data with a meal order device in a meal order system in which
 data representing a meal ordered by a guest, image data representing an image to be printed, and order data including a number of print copies of the image to be printed are transmitted in correlation with each other, the order receiving device comprising:
 ordered meal data receiving means for receiving the ordered meal data transmitted from the meal order device;
 image data receiving means for receiving the image data transmitted from the meal order device;
 order data receiving means for receiving the order data transmitted from the meal order device; and
 printer control means for controlling a printer to print an image represented by the image data received by the image data receiving means, according to the order data received by the order data receiving means.

22. An order receiving device in accordance with claim 21, wherein
 for an ordered meal represented by the meal order data, the prediction time of the end of the meal is predetermined, and
 the printer control means controls the printer to have completely printed the ordered image at the prediction time.

* * * * *